RINGING AND REGULATING DEVICE FOR CARRIER CURRENT TRANSMISSION SYSTEMS
Filed Sept. 13, 1950
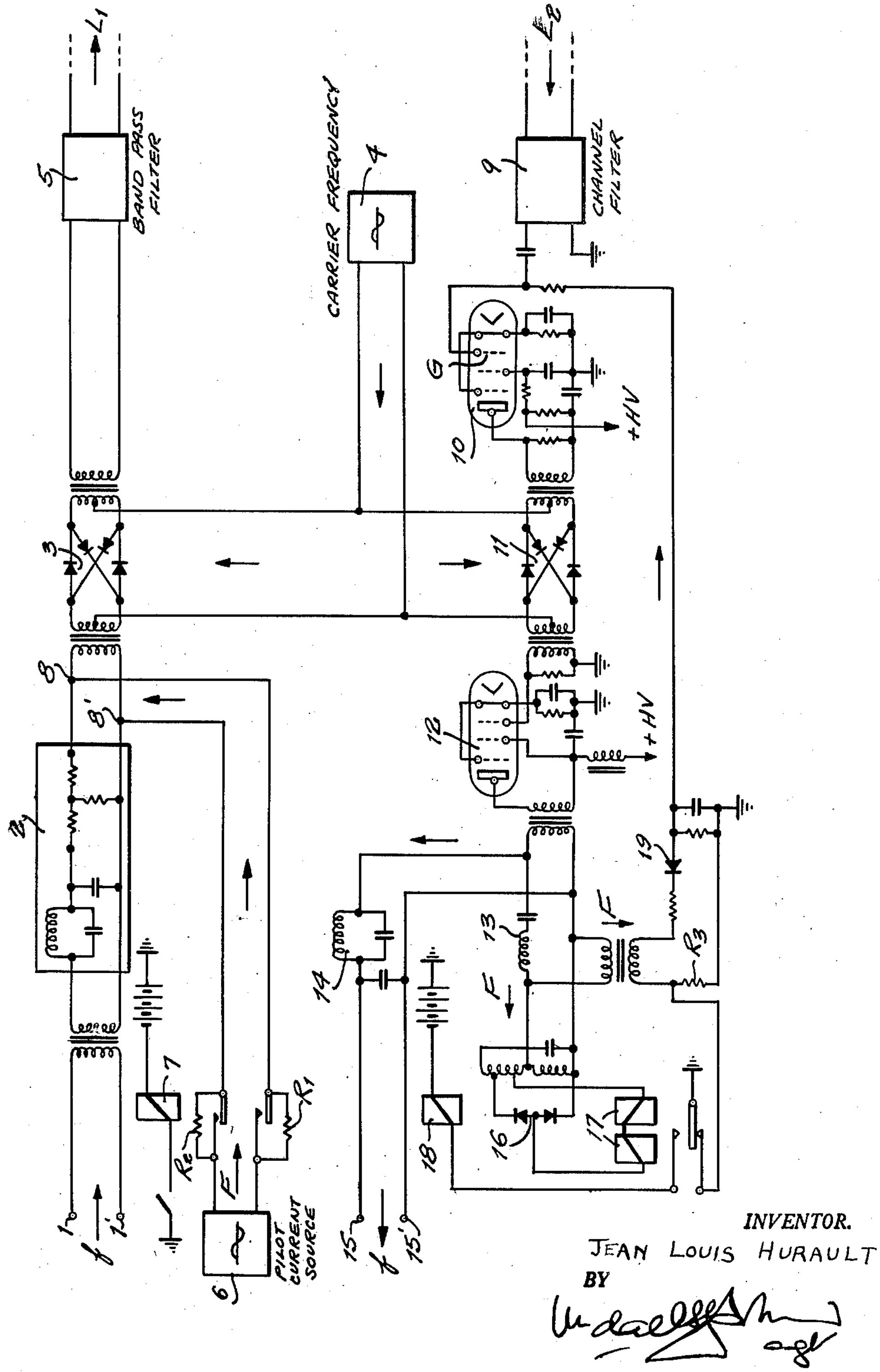
INVENTOR.
JEAN LOUIS HURAULT
BY Patented Oct. 7, 1952 2,613,279

UNITED STATES PATENT OFFICE 2,613,279

RINGING AND REGULATING DEVICE FOR CARRIER CURRENT TRANSMISSION SYSTEMS

Jean Louis Hurault, Paris, France, assignor to Compagnie Industrielle des Telephones, Paris, France, a French corporation Application September 13, 1950, Serial No. 184,647
In France September 2, 1949

8 Claims. (Cl. 179—84)

The object of the present invention is a device making it possible to ensure in a simple manner transmission of ringing or signalling currents and level regulation in carrier current transmission systems comprising one or several communication channels in frequency division, each channel using a distinct frequency band.

It is known that in such systems, particularly when the transmission is carried out on an overhead line, the level of the signals at the input terminals of a receiving station is liable to undergo considerable variations, on account of the variations of the characteristics of the transmission circuit under the influence of various causes.

It has been suggested, in order to overcome this drawback, to send continuously at the sending end of the line a pilot current of a distinct frequency not normally used in the communication channels and of constant amplitude, the variations of which at the input terminals of the receiving station control the gain of an amplifier which is a part of said receiving station, so as to obtain a regulation of the level of the signals received at the output of said amplifier. The frequency of this pilot current is usually chosen equal, for each channel, to the frequency of the carrier current corresponding to said channel or to some frequency intermediate those actually used for the transmission of information in two adjacent channels.

However, if the pilot current is transmitted with a high level, it is liable to cause overloading of the modulators and of other equipment of the receiving stations. This would, for instance, certainly happen if a pilot current of same frequency as that used for regulation purposes but with a higher intensity were employed for the transmission of ringing or signalling currents during time intervals not used for transmission of speech currents or of other information.

The device according to the present invention makes it possible to obviate this drawback while retaining the same pilot frequency for both signalling and regulation purposes, by using a low intensity current of said pilot frequency for regulation and a current of higher intensity of same frequency for signalling; it further makes it possible to ensure the normal operation of the regulation system even during the periods during which signalling currents are received.

The device, the object of the invention is characterized in this, that it comprises, at the transmitting station, means for applying to the transmission line a signal frequency pilot current of high intensity during the signalling periods and of low intensity outside the said periods, and, at the receiving station, a gain control device governed by the low-intensity pilot current, and a signalling current retransmitting relay fed from a current derived from the received pilot current, and arranged so as only to come into action when said pilot current reaches the high intensity which prevails during signalling periods.

On the other hand, in order, at the receiving station, to avoid disturbing the operation of the gain control device during signalling periods, the said station comprises means for ensuring, during the reception of the corresponding high-intensity pilot current, the reduction of the current which controls the gain adjustment, so as to restore the intensity of said control current to substantially the same value as when there is no signalling.

The attached drawing shows, by way of non-limitative example, an embodiment of the device according to the invention; it shows schematically the equipment of one channel of a carrier current system, the transmitting members being shown in the upper part of the drawing, and the receiving members in the lower part thereof.

In the drawing, 1 and 1′ represent the input terminals of the speech currents at voice frequency $f$, 2 is a filler circuit preventing the mixture of the speech frequency and the pilot frequency, 3 is a modulator, to which is applied the carrier frequency current supplied by source 4, 5 is a channel band-pass filter, and $L_1$ represents the outgoing line to the distant station.

On the other hand, 6 represents a source or generator supplying the pilot current, the frequency of which F is chosen outside the voice frequency band. This frequency may be the same as the carrier frequency and the source 6 can then be the same as the source 4; 7 is a relay which is fed when it is desired to send a signalling current, and $R_1$ and $R_2$ are two resistances, arranged in series in the output circuit of the generator 6, and which are short circuited by working contacts of relay 7. On the output side of these resistances, the circuit of source 6 is connected at 8, 8′ to the input terminals of the modulator 3, at the output of the filler circuit 2.

In the receiving part of the station, the input line coming from the distant station is designated by $L_2$, 9 is a channel filter, followed by an amplifier comprising a pentode amplifying tube with variable slope 10, the gain of which can be varied by modifying the biasing voltage of its grid G.

11 is a demodulator, fed from carrier current by the source 4, and 12 is a low frequency amplifier. At the output of this amplifier the speech currents are stopped by the filter 13, while the filter 14 directs them to the terminals 15, 15′ where the voice frequency receiver is connected; on the other hand, the pilot current is stopped by the filter 14 and directed by the filter 13 on the one hand to a detector 19 supplying a direct-current biassing voltage to the grid G of the tube 10, on the other hand to a detector 16, the output current of which feeds a sensitive relay 17, adjusted in such a way that it only operates when its energization current reaches a certain level; by a make contact, this relay causes current to be supplied to a second relay 18, which connects up the signalling current receiving signalling equipment proper. Furthermore, a resistance $R_3$, connected in the biasing circuit of the grid G, is short-circuited by a rest contact of relay 17.

The operation of this assembly is as follows: When there is no signalling, the relay 7 of the transmitting station is not supplied with current, the resistances $R_1$ and $R_2$ are in circuit and the pilot current is sent to the modulator 3 with a low level. At the receiving station the pilot current, which is received at the output of the filter 13, has an insufficient intensity to cause relay 17 to operate; the resistance $R_3$ remains short circuited and the grid G of tube 10 is normally biased. The regulating device operates normally, any variation of the received pilot current causing a variation in a suitable direction of the gain of the tube 10.

When signalling currents are transmitted, the relay 7 short circuits the resistances $R_1$ and $R_2$, the pilot current is then sent to the modulator 3 with a much higher level, and is received, at the output of 13, with a level sufficient to cause relay 17 to operate. The latter, on the one hand, causes the operation of relay 18 which through suitable contacts, not represented on the drawing, causes operation of appropriate signalling equipment in the receiving station, and on the other hand connects up the resistance $R_3$ in the biassing circuit of G, bringing back the biassing voltage to a value of the same order of magnitude as it had when there was no signalling; thus the operation of the regulating device is not affected while signalling is taking place.

The device which has just been described may be, of course applied to automatic ringing systems as well as to manual systems.

What is claimed is:

1. An arrangement for preventing the pilot frequency currents increased during transmission of signalling currents in the transmission of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of signalling currents; means arranged at the receiving part of the station for separating the received pilot frequency currents from the communication currents; an amplifier arranged at the receiving part of the station, said amplifier having an adjustable gain; means for deriving from the received pilot frequency currents a regulating rectified voltage for controlling the gain of said amplifier; means for deriving from the received pilot frequency currents a rectified current; a relay energized by the rectified current derived from the received pilot frequency currents, said relay operating only when the pilot frequency currents are transmitted and received at an increased level controlled by said level increasing means; and a circuit having a contact actuated on the operation of said relay, said circuit being connected to said amplifier so as to decrease the gain thereof by the closing of said contact, whereby at an increased level of the pilot frequency currents said amplifier is controlled so as to keep the anode current thereof substantially constant.

2. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of signalling currents; means arranged at the receiving part of the station for separating the received pilot frequency currents from the communication currents; an amplifier arranged at the receiving part of the station, said amplifier having an adjustable gain; means for deriving from the received pilot frequency currents a regulating rectified voltage for controlling the gain of said amplifier; means for deriving from the received pilot frequency currents a rectified current; a first relay energized by the rectified current derived from the received pilot frequency currents; said first relay operating only when the pilot frequency currents are transmitted and received at an increased level controlled by said level increasing means; a first circuit having a first contact actuated on the operation of said first relay, said first circuit being connected to said amplifier so as to decrease the gain thereof by the closing of said first contact, whereby at an increased level of the pilot frequency currents said amplifier is controlled so as to keep the anode current thereof substantially constant; a second circuit having a second contact actuated by said first relay; and a second relay arranged in said second circuit and being energized upon actuation of said second contact, said second relay being provided for rendering operative a signal equipment at the receiving part of the station.

3. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of signalling currents, said level increasing means including at least one resistance inserted in series to said generator, a contact short-circuiting said resistance, and a relay actuated during transmission of signalling currents and closing upon energization thereof said contact; means arranged at the receiving part of the station for separating the received pilot frequency currents from the communication currents; an amplifier arranged at the receiving part of the station, said amplifier having an adjustable gain; means for deriving from the received pilot frequency currents a regulating rectified voltage for controlling the gain of said amplifier; means for deriving from the received pilot frequency currents a rectified current; a relay energized by the rectified current derived from the received pilot frequency currents, said relay operating only when the pilot frequency currents are transmitted and received at an increased level controlled by said level increasing means; and a circuit having a contact actuated on the operation of said relay, said circuit being connected to said amplifier so as to decrease the gain thereof by the closing of said contact, whereby at an increased level of the pilot frequency currents said amplifier is controlled so as to keep the anode current thereof substantially constant.

4. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of a signalling current; means arranged at the receiving part of the station for separating the received pilot frequency currents from the communication currents; an amplifying tube arranged at the receiving part of the station, said amplifying tube having a control grid; means for deriving from the received pilot frequency currents a rectified voltage for biassing said grid of said amplifying tube so as to control the gain thereof; means for deriving from the received pilot frequency currents a rectified current; a relay energized by the rectified current derived from the received pilot frequency currents, said relay operating only when the pilot frequency currents are transmitted and received at an increased level controlled by said level increasing means; and a circuit having a contact actuated on the operation of said relay, said circuit being connected to said grid of said amplifying tube so as to decrease the gain thereof by the closing of said contact at an increased level of the pilot frequency currents, whereby said amplifying tube is controlled so as to keep the anode current thereof substantially constant.

5. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of signalling currents; means arranged at the receiving part of the station for separating the received pilot frequency currents from the communication currents; an amplifying tube arranged at the receiving part of the station, said amplifying tube having a control grid; means for deriving from the received pilot frequency currents a rectified voltage for biassing said grid of said amplifying tube so as to control the gain thereof; means for deriving from the received pilot frequency currents a rectified current; a relay energized by the rectified current derived from the received pilot frequency currents, said relay operating only when the pilot frequency currents are transmitted and received at an increased level controlled by said level increasing means; and a circuit including a resistance and a contact actuated on energization of said relay, said resistance being inserted in the circuit of said grid of said amplifying tube and being fed by the regulating rectified voltage derived from the received pilot frequency currents.

6. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of signalling currents, said level increasing means including at least one resistance inserted in series to said generator, a contact short-circuiting said resistance, and a relay actuated during transmission of signalling currents and closing upon energization thereof said contact; means arranged at the receiving part of the station for separating the received pilot frequency currents from the communication currents; an amplifier arranged at the receiving part of the station, said amplifier having an adjustable gain; means for deriving from the received pilot frequency currents a regulating rectified voltage for controlling the gain of said amplifier; means for deriving from the received pilot frequency currents a rectified current; a first relay energized by the rectified current derived from the received pilot frequency currents, said first relay operating only when the pilot frequency currents are transmitted and received at an increased level controlled by said level increasing means; a first circuit having a first contact actuated on the operation of said first relay, said first circuit being connected to said amplifier so as to decrease the gain thereof by the closing of said first contact, whereby at an increased level of the pilot frequency currents said amplifier is controlled so as to keep the anode current thereof substantially constant; a second circuit having a second contact actuated by said first relay; and a second relay arranged in said second circuit and being energized upon actuation of said second contact, said second relay being provided for rendering operative a signal equipment at the receiving part of the station.

7. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of a signalling current; means arranged at the receiving part of the station for separating the received pilot frequency currents from the communication currents; an amplifying tube arranged at the receiving part of the station, said amplifying tube having a control grid; means for deriving from the received pilot frequency currents a rectified voltage for biassing said grid of said amplifying tube so as to control the gain thereof; means for deriving from the received pilot frequency currents a rectified current; a first relay energized by the rectified current derived from the received pilot frequency currents, said first relay operating only when the pilot frequency currents are transmitted and received at an increased level controlled by said level increasing means; a first circuit having a first contact actuated on the operation of said first relay, said first circuit being connected to said amplifier so as to decrease the gain thereof by the closing of said first contact, whereby at an increased level of the pilot frequency currents said amplifier is controlled so as to keep the anode current thereof substantially constant; a second circuit having a second contact actuated by said first relay; and a second relay arranged in said second circuit and being energized upon actuation of said second contact, said second relay being provided for rendering operative a signal equipment at the receiving part of the station.

8. An arrangement for preventing the pilot frequency currents increased during transmission of signalling currents in the transmission line of the transmitting part of a carrier current communication station from affecting the communication currents at the receiving part of the station, comprising in combination, a generator connected to the transmission line of the station, said generator generating pilot frequency currents; means connected to said generator for keeping the pilot frequency currents at a low level while no signalling currents are transmitted; means for increasing the level of the pilot frequency currents during a transmission of signalling currents; means arranged at the receiving part of the station for separating the received pilot frequency currents from the communication currents; an amplifying tube arranged at the receiving part of the station, said amplifying tube having a control grid; means for deriving from the received pilot frequency currents a rectified voltage for biassing said grid of said amplifying tube so as to control the gain thereof; means for deriving from the received pilot frequency currents a rectified current; a first relay energized by the rectified current derived from the received pilot frequency currents, said first relay operating only when the pilot frequency currents are transmitted and received at an increased level controlled by said level increasing means; a first circuit having a first contact actuated on the operation of said first relay, said first circuit being connected to said amplifier so as to decrease the gain thereof by the closing of said first contact, whereby at an increased level of the pilot frequency currents said amplifier is controlled so as to keep the anode current thereof substantially constant; a second circuit having a second contact actuated by said first relay; and a second relay arranged in said second circuit and being energized upon actuation of said second contact, said second relay being provided for rendering operative a signal equipment at the receiving part of the station.

JEAN LOUIS HURAULT.

REFERENCES CITED

The following references are of record in the file of this patent:

UNITED STATES PATENTS

| Number | Name | Date |
|---|---|---|
| 2,145,053 | Meszar | Jan. 24, 1939 |
| 2,210,957 | Skillman | Aug. 13, 1940 |
| 2,300,415 | Green | Nov. 3, 1942 |
| 2,310,749 | Ressler | Feb. 9, 1943 |
| 2,319,306 | Dickieson | May 18, 1943 |
| 2,414,795 | Brandt | Jan. 28, 1947 |